US009709071B2

(12) United States Patent
Robles et al.

(10) Patent No.: US 9,709,071 B2
(45) Date of Patent: Jul. 18, 2017

(54) SELF-CLEANING SCREW-TYPE CENTRIFUGAL WHEEL PUMP WITH RECIRCULATION BEHIND THE IMPELLER

(75) Inventors: Ciro Robles, Neunkirch (CH); Carl Stahle, Neunkirch (CH)

(73) Assignee: Frideco AG, Neunkirch (CH)

( * ) Notice: Subject to any disclaimer, the term of this patent is extended or adjusted under 35 U.S.C. 154(b) by 986 days.

(21) Appl. No.: 13/989,086

(22) PCT Filed: Nov. 24, 2011

(86) PCT No.: PCT/EP2011/070995
§ 371 (c)(1),
(2), (4) Date: May 23, 2013

(87) PCT Pub. No.: WO2012/069618
PCT Pub. Date: May 31, 2012

(65) Prior Publication Data

US 2013/0243634 A1 Sep. 19, 2013

(30) Foreign Application Priority Data

Nov. 24, 2010 (EP) .................................... 10192467

(51) Int. Cl.
*F04D 29/00* (2006.01)
*F04D 29/40* (2006.01)
(Continued)

(52) U.S. Cl.
CPC ................ *F04D 29/40* (2013.01); *F04C 2/16* (2013.01); *F04D 7/04* (2013.01); *F04D 29/445* (2013.01);
(Continued)

(58) Field of Classification Search
CPC ...... F04D 29/708; F04D 29/40; F04D 29/445; F04D 29/128; F04D 29/126;
(Continued)

(56) References Cited

U.S. PATENT DOCUMENTS 2,769,390 A 11/1956 Heimbuch
3,115,841 A 12/1963 Tilson
(Continued)

FOREIGN PATENT DOCUMENTS

CH 396639 A 7/1965
CN 101294580 B 4/2010
(Continued)

OTHER PUBLICATIONS

Office Action dated Nov. 27, 2015 issued in corresponding CN patent application No. 201180056681.8 (and English letter regarding concise explanation of relevance of Office Action from CN associate).
(Continued)

*Primary Examiner* — Gregory Anderson
*Assistant Examiner* — Jason Fountain
(74) *Attorney, Agent, or Firm* — Posz Law Group, PLC

(57) ABSTRACT

The screw-type centrifugal wheel pump includes a pump housing and a screw-type centrifugal wheel arranged rotatably within the pump housing and having a hub and a blade, and comprises a rotatable drive shaft connected to the screw-type centrifugal wheel, and includes a cover plate arranged between the screw-type centrifugal wheel and a housing rear wall, wherein the cover plate has a central opening through which the hub or the drive shaft runs, and wherein an interior space is formed between the cover plate and the housing rear wall, wherein a gap is formed between the central opening of the cover plate and the hub or the drive shaft, which gap is connected in fluid-conducting fashion to the interior space, wherein the cover plate has at least one aperture, which is arranged spaced apart from the central opening, in order to generate a fluid flow which flows into the interior space via the aperture and out of the interior space again via the gap.

29 Claims, 7 Drawing Sheets

(51) Int. Cl.

| | |
|---|---|
| ***F04D 7/04*** | (2006.01) |
| ***F04D 29/44*** | (2006.01) |
| ***F04D 29/70*** | (2006.01) |
| ***F04C 2/16*** | (2006.01) |

(52) U.S. Cl.
CPC ........ *F04D 29/708* (2013.01); *F05D 2250/15* (2013.01)

(58) Field of Classification Search
CPC ............. F04D 29/4246; F04D 29/4266; F04D 29/4286; F04C 2/16
See application file for complete search history.

(56) References Cited

U.S. PATENT DOCUMENTS

| | | | | |
|---|---|---|---|---|
| 3,632,220 A | | 1/1972 | Lansinger | |
| 4,575,312 A | * | 3/1986 | Erikson | F04D 29/225 415/206 |
| 4,648,796 A | * | 3/1987 | Maghenzani | F04D 29/2216 415/218.1 |
| 5,167,418 A | * | 12/1992 | Dunford | F04D 1/12 277/423 |
| 5,553,868 A | * | 9/1996 | Dunford | F16J 15/3404 277/348 |
| 7,037,069 B2 | * | 5/2006 | Arnold | F04D 7/045 415/128 |

FOREIGN PATENT DOCUMENTS

| | | | |
|---|---|---|---|
| EP | 1041320 | A2 | 10/2000 |
| EP | 10192467 | | 11/2011 |
| EP | 2011070995 | | 11/2011 |
| GB | 1125376 | A | 8/1968 |
| JP | 2013-540375 | | 3/2015 |
| WO | 8606799 | A1 | 11/1986 |

OTHER PUBLICATIONS

Office Action issued by the Chinese Patent Office on Mar. 31, 2015 in corresponding Chinese patent application No. 201180056681.8 (and English translation).

Office Action issued Oct. 27, 2015 in the corresponding JP application No. 2013-540375 (with English translation).

Office Action mailed May 13, 2016 issued in the corresponding Chinese Patent Application No. 201180056681.8 (and English translation).

* cited by examiner

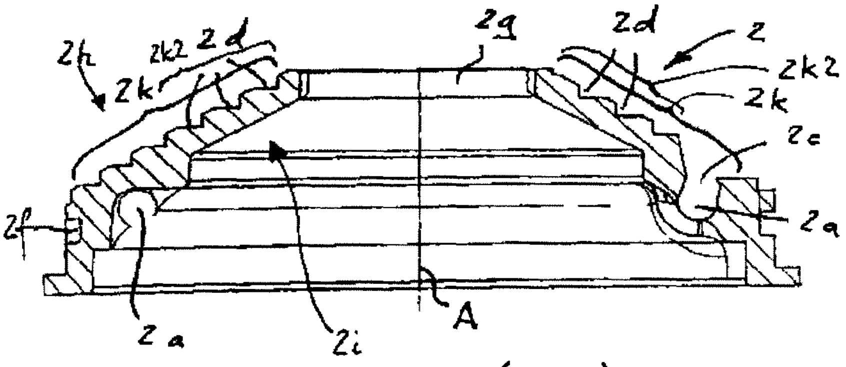
Figure 8 (B-B)
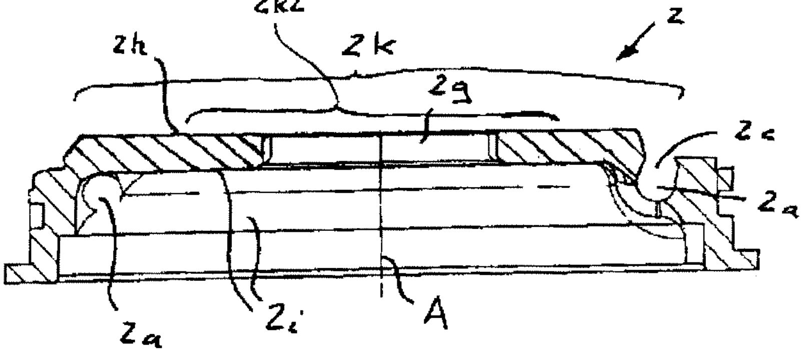
Figure 9
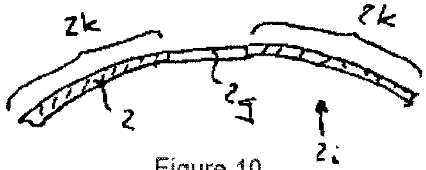
Figure 10
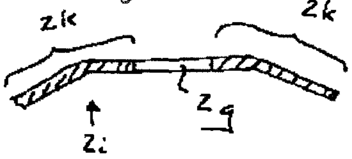
Figure 11

SELF-CLEANING SCREW-TYPE CENTRIFUGAL WHEEL PUMP WITH RECIRCULATION BEHIND THE IMPELLER

RELATED APPLICATIONS

This Application is a National Phase Application of, and claims priority to, PCT Application No. PCT/EP2011/070995, the disclosure of which is incorporated herein by reference The invention relates to a screw-type centrifugal wheel pump, to a method for operating a screw-type centrifugal wheel pump, and to a cover plate for a screw-type centrifugal wheel pump.

Prior Art

Document CH 662 864 discloses a screw-type centrifugal wheel pump, wherein the screw-type centrifugal wheel is rotatably mounted on a rotary axle. The screw-type centrifugal wheel pump has a cavity in the region of the connection between the screw-type centrifugal wheel and the rotary axle. Said embodiment, which has in itself proven to be highly successful, of a screw-type centrifugal wheel pump has the disadvantage that contaminants can be deposited and accumulate within the cavity. This results in increased wear and/or increased maintenance outlay.

PRESENTATION OF THE INVENTION

It is an objective of the present invention to develop a screw-type centrifugal wheel pump and a method for cleaning a screw-type centrifugal wheel pump, which have more advantageous characteristics with regard to the deposition of contaminants.

The objective is achieved in particular by means of a screw-type centrifugal wheel pump comprising a pump housing with a pump inflow opening and with a housing rear wall arranged opposite the pump inflow opening, comprising a screw-type centrifugal wheel which is rotatably arranged within the pump housing and which has a hub and an impeller, and comprising a rotatable drive shaft which is connected to the screw-type centrifugal wheel, and comprising a cover plate which is arranged between the screw-type centrifugal wheel and the housing rear wall, wherein the cover plate has a central opening through which the hub or the drive shaft extends, and wherein an interior space is formed between the cover plate and the housing rear wall, wherein the cover plate has a front side oriented toward the pump inflow opening, and wherein the front side comprises a partial surface the form of which is adapted to the rear side of the screw-type centrifugal wheel in such a way that a gap of at most up to 3 mm is formed between the front side of the cover plate and the rear side of the screw-type centrifugal wheel, wherein between the central opening of the cover plate and the hub or the drive shaft there is formed a gap which is connected in fluid-conducting fashion to the interior space and to the gap, wherein the cover plate has at least one aperture which is arranged spaced apart from the central opening, wherein the screw-type centrifugal wheel and the arrangement of the aperture are adapted to one another such that the rear side of the screw-type centrifugal wheel does not cover the aperture or covers the aperture only over a partial angle in a rotation of the screw-type centrifugal wheel through 360°, and wherein the aperture forms a fluid-conducting connection between the front side and the interior space in order to generate a fluid flow which flows into the interior space via the aperture and then flows out of the interior space via the gap.

The screw-type centrifugal wheel pump according to the invention and the method according to the invention have the advantage that, during pump operation, a partial flow is generated which flows from the front side to the rear side of the cover plate and subsequently flows along a central opening of the cover plate to the front side of the cover plate, such that a cleaning flow is generated which is capable of at least partially conveying any contaminants situated or deposited in the cavity behind the cover plate back to the front side of the cover plate, such that said contaminants can be conveyed away by means of the main flow of the screw-type centrifugal wheel pump.

The screw-type centrifugal wheel pump according to the invention comprises a rotatably mounted screw-type centrifugal wheel and a cover plate which is arranged directly adjacent to the screw-type centrifugal wheel and which has a central opening, wherein a hub or a drive shaft of the screw-type centrifugal wheel preferably extends through the central opening. A fluid-conducting gap is formed between the central opening and the hub or the drive shaft. The rotation of the screw-type centrifugal wheel in a direction of rotation has the effect that a fluid is conveyed along a main flow, which has the result that a partial flow of the fluid flows to the rear side of the cover plate via an aperture which is spaced apart from the central opening, and that said partial flow subsequently flows to the main flow via the fluid-conducting gap, owing to the pressure difference prevailing between the aperture and the fluid-conducting gap. Said partial flow forms a cleaning fluid flow which flows in particular through the rear-side space of the cover plate and supplies any contaminants present therein to the main flow.

The cover plate preferably extends, on the side facing toward the screw-type centrifugal wheel or on the partial surface facing toward the screw-type centrifugal wheel, correspondingly to the form of the rear side of the screw-type centrifugal wheel, such that the partial surface preferably extends in frustoconical or planar form, wherein the partial surface could also have some other profile form, for example a curved or polyhedral form.

The objective is also achieved in particular by means of a method for the self-cleaning of a screw-type centrifugal wheel pump having a rotatably mounted screw-type centrifugal wheel and having a cover plate which is arranged, so as to form a gap, on the rear side of the screw-type centrifugal wheel and which has a central opening, wherein the cover plate has an aperture which is spaced apart from the central opening, wherein a hub or a drive shaft of the screw-type centrifugal wheel extends through the central opening such that a fluid-conducting gap is formed between the central opening and the hub or the drive shaft, wherein the screw-type centrifugal wheel and the arrangement of the aperture are adapted to one another such that, in the rotation of the screw-type centrifugal wheel, the rear side of the screw-type centrifugal wheel does not cover the aperture or covers the aperture only over a partial angle Δ, wherein the screw-type centrifugal wheel is rotated in the direction of rotation and thereby delivers a fluid along a main flow, wherein a partial flow F1 of the fluid flows via the aperture to the rear side of the cover plate, and wherein said partial flow subsequently flows to the main flow via the gaps owing to the pressure difference prevailing between the aperture and the gap.

The objective is also achieved in particular by means of a cover plate for a screw-type centrifugal wheel pump, wherein the cover plate has a front side and a rear side, and wherein the cover plate has a central opening in its center, wherein the central opening is adapted for the passage of an axis of rotation of the screw-type centrifugal wheel and extends in the direction of the axis of rotation, and wherein the cover plate has at least one aperture which is arranged spaced apart from the central opening, and wherein the aperture forms a fluid-conducting connection between the front side and the rear side of the cover plate, and wherein the aperture has an inlet opening in the direction of the front side, and wherein the front side has a depression, wherein the inlet opening is arranged in said depression, and wherein the inlet opening forms an inlet face which extends substantially parallel to the axis of rotation A.

The invention will be described in detail below on the basis of exemplary embodiments.

BRIEF DESCRIPTION OF THE DRAWINGS

In the drawings used for the explanation of the exemplary embodiments:

FIG. 8 shows a section through the cover plate of FIG. 6 along the line B-B;

FIG. 9 shows a section through a further exemplary embodiment of a cover plate;

FIGS. 10, 11 schematically show a section through two further exemplary embodiments of cover plates;

It is basically the case in the drawings that identical parts are denoted by the same reference numerals.

Ways of Implementing the Invention

Figure 1:
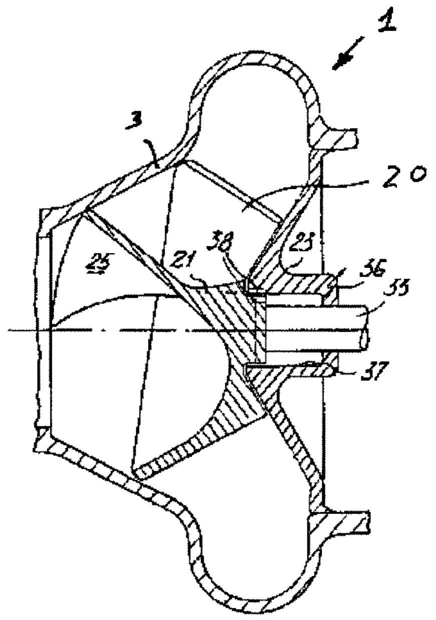
FIG. 1 shows an axial section of a screw-type centrifugal wheel pump known from the prior art.

FIG. 1 shows an embodiment, known from the prior art and disclosed in document CH 662 864, of a screw-type centrifugal wheel pump. FIG. 1 shows an axial section through the screw-type centrifugal wheel pump 1 comprising a screw-type centrifugal wheel 20 with a hub and an impeller 25, comprising a drive shaft 33 which is fixedly connected to the hub 21, comprising a housing rear wall 23 arranged behind the screw-type centrifugal wheel 20, and also comprising a housing outer wall 3 which surrounds the screw-type centrifugal wheel 20 in the circumferential direction. Provided in the housing rear wall 23 in the vicinity of the drive shaft 33 is an outlet opening 36 for permitting the escape of gases which are entrained in the delivery medium and which are separated off toward the center of rotation of the rotor and which pass into the interior space 37 through the gap at the rotor rear side between the rotor hub 21 and the housing rear wall 23. The gap between the rotor hub 21 and the housing rear wall 23 is formed as a labyrinth, wherein both the labyrinth structure on the hub and also the labyrinth structure on the housing rear wall are interrupted by means of a transverse groove 38 in order that a self-cleaning action is attained and no entrained solid matter passes into the interior space 37 and the outlet opening 36. It has however been found that, despite said measure, contaminants can pass into the interior space 37, wherein said contaminants can be deposited and accumulate in the interior space 37 such that cleaning of the screw-type centrifugal wheel pump is necessary at certain time intervals.

Figure 1A:
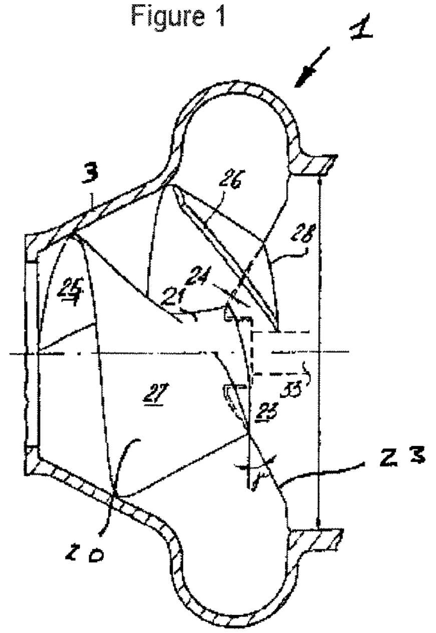
FIG. 1*a* shows a side view of the screw-type centrifugal wheel pump illustrated in FIG. 1, with the outer housing cut away.
Figure 1B:
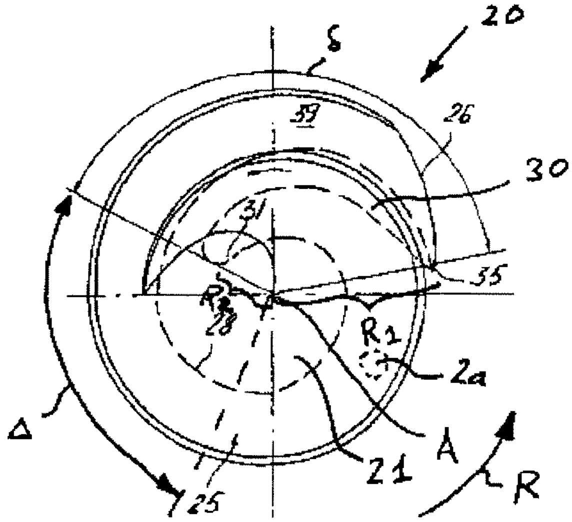
FIG. 1*b* shows a plan view of a rotor.

FIG. 1*a* shows a side view of the screw-type centrifugal wheel pump 1 illustrated in FIG. 1, with the outer housing 3 cut away. FIG. 1*b* shows, in a plan view, an exemplary embodiment of a screw-type centrifugal wheel 20, which is not disclosed as such in document CH 662 864 but which would be suitable for the screw-type centrifugal wheel pump 1 illustrated in FIGS. 1 and 1*a*, for which reason FIGS. 1, 1*a* and 1*b* are discussed jointly. The screw-type centrifugal wheel 20 of the screw-type centrifugal wheel pump 1 comprises a hub 21 with a sickle-shaped base part 30 to which an impeller 25 is connected, wherein an axle 33 extends through the pressure-side housing wall 23, the latter being in the form of a truncated cone, and is connected to the hub 21. The housing wall 23, which has a cone angle $\gamma$ of between 5° and 70°, is passed over with a small degree of clearance 24 by the face edge 28 of the pressure-side impeller flank 27. The impeller 25 also comprises a suction-side flank 39. The sickle-shaped base part 30 extends from the impeller trailing tip 35, at which the end edge 26 terminates, in sickle or spiral form over a relatively large distance around the pump axis as far as a point 31 at which the hub 21 has a relatively small radius R2. The hub 21 has the greatest radius R1 at the impeller trailing tip 35. As a result, a relatively large surface area of the housing wall 23 is exposed over a relatively large arc $\delta$, which is expediently approximately 120°, between the impeller trailing tip 35 and the stated hub point 31. The exposure of the housing wall 23 as a result of the reduction of the rotor hub radius R1 may be provided to such an extent as is permitted by the material parameters in order to ensure an adequately high strength of the screw-type centrifugal wheel 20.

Figure 2:
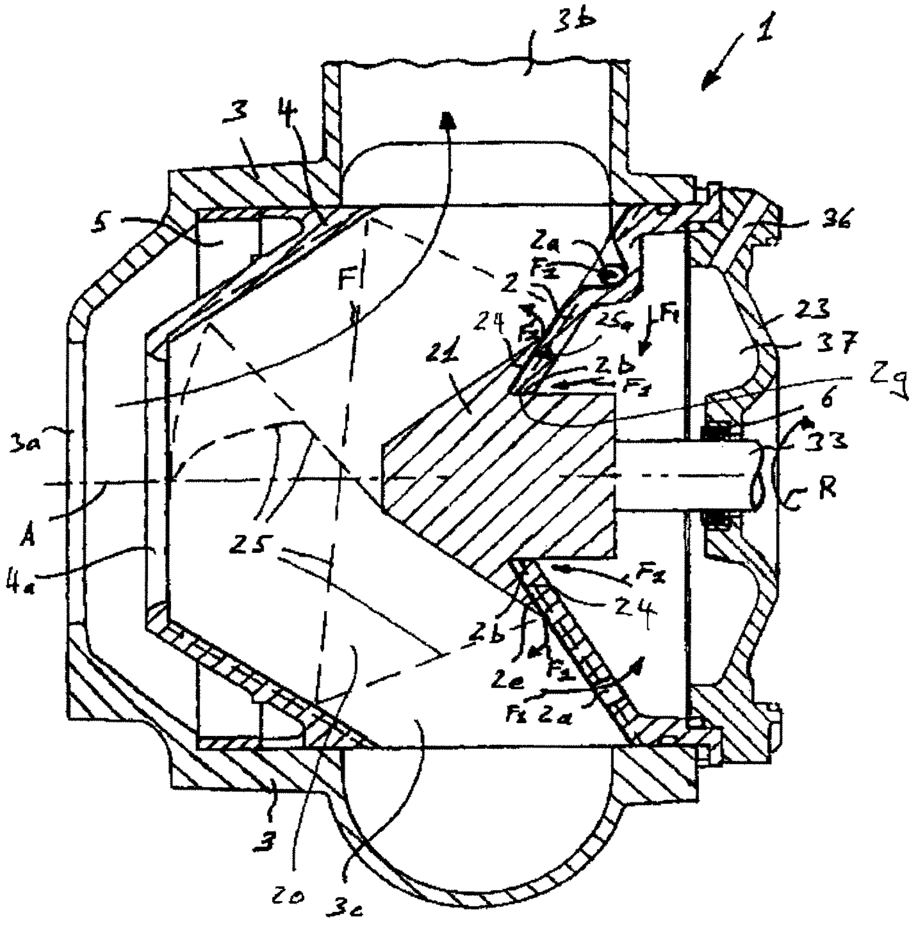
FIG. 2 shows, in a longitudinal section, a partial view of a screw-type centrifugal wheel pump with an exemplary embodiment of a cover plate.

FIG. 2 shows, in a longitudinal section, an exemplary embodiment of a screw-type centrifugal wheel pump 1 according to the invention. The screw-type centrifugal wheel pump 1 comprises a pump housing 3 with an inlet opening 3*a* or pump inflow opening 3*a*, an outlet 3*b* and a housing interior space 3*c*, and also comprises a hub 21 which is connected to an impeller 25, the latter being illustrated merely schematically and by dashed lines, and which in the process forms a vane-type centrifugal wheel 20 and which is rotatably mounted by means of a drive shaft 33 which is rotatable about an axis A. The connection between the drive shaft 33 and the hub 21 is merely schematically illustrated. The impeller 25 and the hub 21 are preferably, as illustrated in FIGS. 1*a* and 1*b*, formed as a single common part or as a vane-type centrifugal wheel 20. In the exemplary embodiment illustrated, the screw-type centrifugal wheel pump 1 also has a conical inner housing 4 with inlet opening 4*a* and a spacer ring 5. The screw-type centrifugal wheel pump 1 also comprises a housing rear wall 23 with an outlet opening 36 and a seal 6. The outlet opening 36 serves for maintenance purposes and is normally closed from the outside by means of a plug during the operation of the screw-type centrifugal wheel pump 1. In the rotation of the vane-type centrifugal wheel 20, a main flow F is generated which passes via the inlet opening 3*a* to the outlet 3*b*. The conveyed main flow F comprises a fluid, preferably water and possibly gases such as water vapor, wherein the screw-type centrifugal wheel pump 1 is, in a preferred application, used for conveying contaminated water, such that the main flow F may also encompass solid matter, for example feces, sand, grit, textiles, fibers, plastic parts etc.

The screw-type centrifugal wheel pump 1 also comprises a cover plate 2 which, as viewed in the direction of extent of the axis A, is arranged directly behind the hub 21 or the screw-type centrifugal wheel 20. The cover plate 2 has a front side 2*h* and a rear side 2*i*, wherein the front side 2*h* comprises a partial surface 2*k*, the form of which is implemented to be adapted to the rear side 25*a* of the screw-type centrifugal wheel 20 in such a way that a gap 24 of maximally 3 mm is formed between the front side 2*h* of the cover plate 2 and the rear side 25*a* of the screw-type centrifugal wheel 20. The gap 24 preferably has a width in the range between 0.5 mm and 2 mm. The gap 24 is inter alia formed so as to be so narrow that solid matter, for example fabrics present in the wastewater such as ladies' stockings, cannot enter into the gap 24 or even wind themselves around the hub. The narrow gap 24 furthermore generates a shear action on solid matter situated within the gap 24, such that said solid matter is mechanically broken down and conveyed toward the main flow F. In a preferred refinement, at least one of the surfaces oriented toward the gap 24 is embodied in a structured or rough fashion or provided for example with protruding teeth in order to improve a mechanical breakdown of solid matter situated in the gap 24. A gap 24 wider than 3 mm, for example 5 mm or wider, would have numerous disadvantages. Firstly, owing to the wide gap 24, the mechanical breakdown of solid matter would no longer be ensured. Furthermore, a wide gap 24 would considerably reduce the efficiency of the screw-type centrifugal wheel pump 1. In the exemplary embodiment shown, the front side 2*h* comprises a partial surface 2*k* which extends substantially in frustoconical form, the form of which partial surface 2*k* is implemented adapted to the rear side of a screw-type centrifugal wheel 20, wherein the partial surface 2*k* has a central opening 2*g* in its center, wherein the central opening 2*g* extends parallel in the direction of the axis A. The hub 21 extends through the central opening 2*g*, such that a gap 2*b* extending in the direction of the axis A is formed between the central opening 2*g* and the hub 21. The hub 21 furthermore has a protrusion which partially covers the partial surface 2*k*, such that a gap 24, which in the exemplary embodiment shown extends transversely with respect to the axis A, is formed between the hub 21 and the partial surface 2*k*. The cover plate 2 has at least one aperture 2*a* which is arranged spaced apart from the central opening 2*g*, wherein the aperture 2*a* forms a fluid-conducting connection between the front side 2*h* and the rear side 2*i* of the cover plate 2. During pump operation, or in the rotation of the vane-type centrifugal wheel 20 in a direction of rotation R, the fluid has a higher pressure in the region of the aperture 2*a* than in the region of the central opening 2*g*, whereby a partial flow F1 is generated by virtue of part of the main flow F flowing as a partial flow F1 through the opening 2*a* to the rear side 2*i* of the cover plate 2 into the interior space 37, and subsequently flowing via the gap 2*b* and the gap 24 into the main flow F. Said partial flow F1 has the effect that contaminants situated in the interior space 37 are conveyed out of the latter and supplied to the main flow F.

The screw-type centrifugal wheel 20 and the arrangement of the aperture 2*a* are implemented adapted to one another such that the rear side 25*a* of the screw-type centrifugal wheel 20 does not cover the aperture 2*a* or, in a rotation of the screw-type centrifugal wheel 20 through 360°, covers the aperture 2*a* only over a partial angle Δ.

Figure 12:
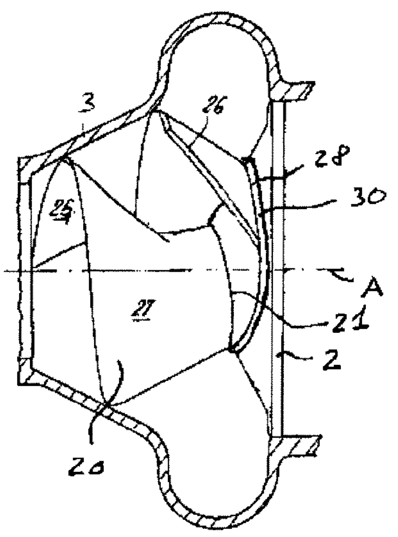
FIG. 12 shows a side view of a further exemplary embodiment of a rotor of a screw-type centrifugal wheel pump with the outer housing cut away.
Figure 13:
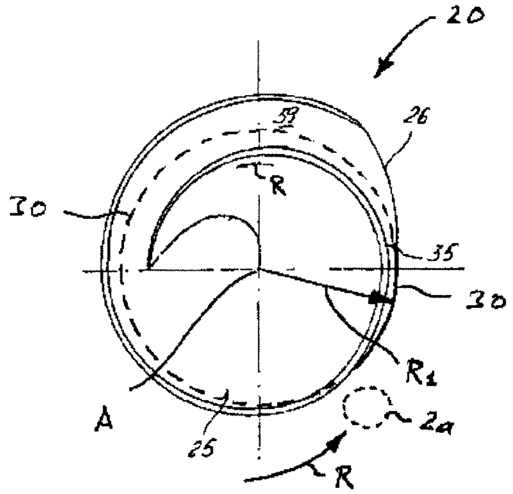
FIG. 13 shows a plan view of the rotor of the screw-type centrifugal wheel pump illustrated in FIG. 12.

In one advantageous embodiment, the screw-type centrifugal wheel 20 could be designed as illustrated in FIGS. 12 and 13. FIG. 12 shows a pump housing 3 in which a cover plate 2 and a screw-type centrifugal wheel 20 are arranged. The hub 21 is connected to a circular base part 30, wherein the impeller 25 is connected by means of its face edge 28 to the base part 30. The screw-type centrifugal wheel 20 comprises an end edge 26, a pressure-side impeller flank 27, a suction-side flank 39, and an impeller trailing tip 35. FIG. 13 shows the screw-type centrifugal wheel 20 in a plan view, wherein the base part 30 is of circular form and has a maximum radius R1 with respect to the axis A. FIG. 13 shows, by way of example, a possible arrangement of an opening or an aperture 2*a* with respect to the screw-type centrifugal wheel 20. In said arrangement, the aperture 2*a* is not covered by the screw-type centrifugal wheel 20 or by the rear side 25*a* of the screw-type centrifugal wheel 20, such that the aperture 2*a* is permanently open. Herein, a flow in a direction of rotation R of the screw-type centrifugal wheel 20 is advantageously generated in the region of the aperture 2*a* in order to hinder or prevent solid contaminants from entering the aperture 2*a*. A fluid-conducting connection between the front side 2*h* and the interior space 37 is implemented by the aperture 2*a* in order to generate a fluid flow F1 which flows into the interior space 37 via the aperture 2*a* and then flows out of the interior space 37 via the gap 2*b*.

In a further advantageous embodiment, the screw-type centrifugal wheel 20 could be implemented as illustrated in FIGS. 1*a* and 1*b*. The hub 21 of the screw-type centrifugal wheel 20 comprises a sickle-shaped base part 30, wherein the impeller 25 is arranged on the sickle-shaped base part 30 and the sickle-shaped base part 30 has, with respect to the axis of rotation A, a maximum radius R1 and a minimum radius R2. The sickle-shaped base part 30 is designed to extend relative to the aperture 2*a* such that the rear side 25*a* of the screw-type centrifugal wheel 20 does not cover the aperture 2*a* at the minimum radius R2, wherein the rear side 25*a* of the screw-type centrifugal wheel 20 covers the aperture 2*a* over a partial angle in a rotation of the screw-type centrifugal wheel 20 through 360°. The aperture 2*a* is therefore briefly covered in every rotation of the screw-type centrifugal wheel 20. Said embodiment has the advantage that a flow in the direction of rotation R of the screw-type centrifugal wheel 20 is advantageously generated in the region of the aperture 2*a* in order to hinder or prevent solid contaminants from entering the aperture 2*a*. A further advantage is to be seen in the fact that solid contaminants deposited at the inlet opening of the aperture 2*a* are, if protruding beyond the front side 2*h*, mechanically removed by the hub 21, 30 moving over the aperture 2*a*.

The drive shaft 33 could also extend farther forward, such that the gap 2*b* is formed at least partially or also exclusively between the cover plate 2 and the drive shaft 33.

Figure 3:
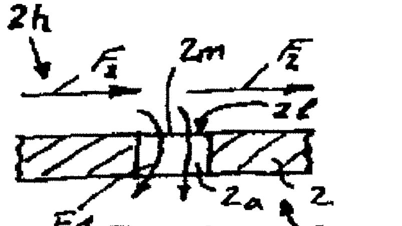
FIGS. 3 to 5 show differently-extending apertures.

The cover plate 2 has at least one aperture 2*a* and preferably at least two apertures 2*a*. The apertures 2*a* are advantageously arranged in the partial surface 2*k* so as to be symmetrical with respect to the axis A. The apertures 2*a* may be implemented in numerous possible configurations. The aperture 2*a* depicted at the bottom of FIG. 2 is shown in FIG. 3 on an enlarged scale. A flow F2 flows on the front side 2*h* of the cover plate 2. The opening 2 comprises an inlet opening 21, the cross section of which forms an inlet face 2*m*. The partial flow F1 flows through the aperture 2*a* to the rear side 2*i* of the cover plate 2. The partial flow F1 is diverted as it flows into the aperture 2*a*, which yields the advantage that solid matter situated in the flow F2 are hindered when flowing into the aperture 2*a*. The partial flow F1 is thereby at least partially purified of solid matter because the solid matter at least partially remains in, and is conveyed onward by, the flow F2.

The cover plate 2 could, similarly to the housing rear wall depicted in FIG. 1*a*, have a cone angle γ in the range between 5° and 70°.

Figure 4:
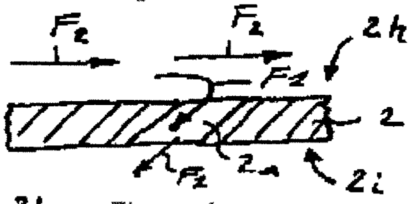

FIG. 4 shows a further exemplary embodiment of an aperture 2*a*. By contrast to the embodiment illustrated in FIG. 3, the aperture 2*a* depicted in FIG. 4 is arranged to extend such that the partial flow F1 is diverted in relation to the flow F2 prevailing on the front side 2*h* of the cover plate 2, in such a way that said partial flow F1 experiences a partial flow reversal. The aperture 2*a* extends, as shown in FIG. 4, at least partially oppositely to the direction of rotation R of the screw-type centrifugal wheel 20. The aperture 2*a* extending in this way has the advantage that solid matter is less able to pass through the aperture 2*a* to the rear side 2*i* of the cover plate 2.

Figure 5:
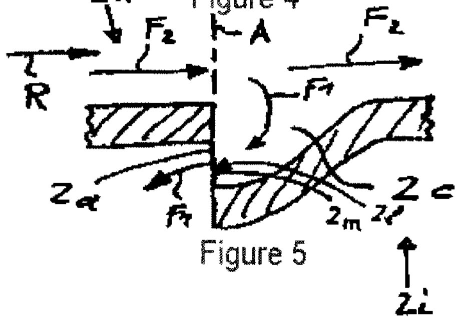

The aperture 2*a* depicted at the top in FIG. 2 is shown in FIG. 5 on an enlarged scale. On the front side 2*h* of the cover plate 2 there is arranged a depression 2*c* which opens out towards the aperture 2*a*, wherein the aperture 2*a* forms an inlet opening 21 with inlet face 2*m*, such that the inlet opening 21 is arranged in the depression 2*c*. The inlet opening 21 or the inlet face 2*m* may be arranged in a variety of ways, but advantageously, as illustrated in FIG. 5, such that the partial flow F1 is diverted and experiences an at least partial flow reversal with respect to the flow F2 prevailing on the front side 2*h* of the cover plate 2. The inlet opening 21 arranged in this way has the advantage that solid matter is less able to pass through the aperture 2*a* to the rear side 2*i* of the cover plate 2. As illustrated in FIG. 5, the inlet face 2*m* is, in an advantageous embodiment, arranged so as to extend parallel or substantially parallel to the axis A. As illustrated in FIG. 5, the inlet face 2*m* is preferably oriented to face oppositely to the direction of rotation R. The illustration of FIG. 5 shows not the axis A itself but rather the direction of extent of the axis A. As illustrated in FIG. 5, the inlet face 2*m* is, in a further advantageous embodiment, arranged so as to extend perpendicular or substantially perpendicular to the direction of rotation R of the drive shaft 33, wherein the inlet face 2*m* is arranged so as to face oppositely to the direction of rotation R.

Figure 6:
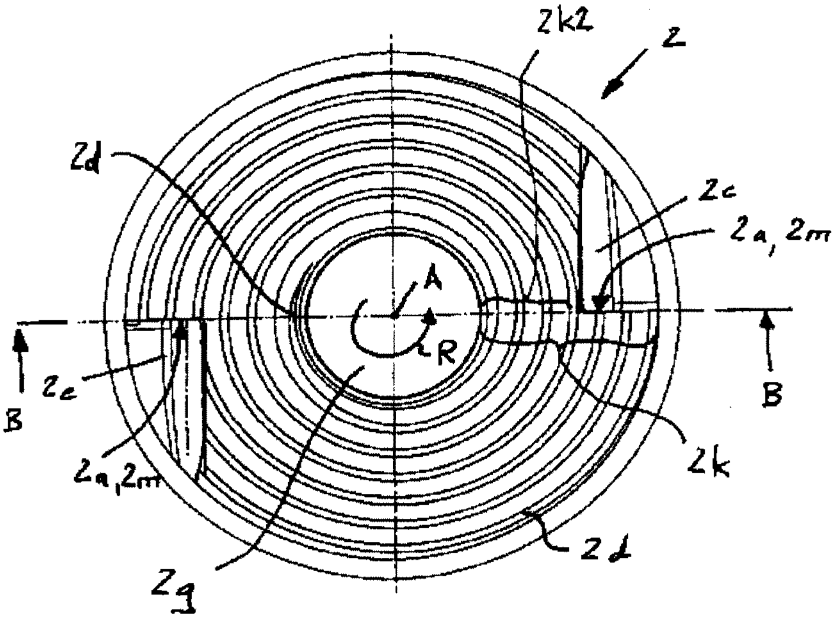
FIG. 6 shows a plan view of a cover plate.
Figure 7:
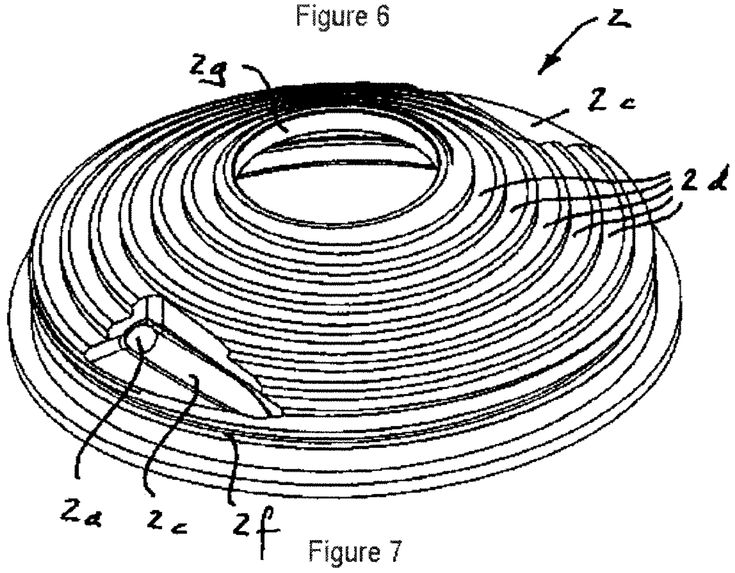
FIG. 7 shows a perspective view of the cover plate illustrated in FIG. 6.

FIGS. 6, 7 and 8 show an exemplary embodiment of a cover plate 2 in a plan view, in a perspective view, and in a section along the section line B-B. In an advantageous embodiment, the depression 2*c* may, as illustrated in FIGS. 6 and 7, be formed at least partially by a bore extending substantially perpendicular or perpendicular to the axis A. FIG. 6 shows the profile of the axis A and the preferred direction of rotation R. It can thus be seen from FIG. 6 that the inlet face 2*m* extends parallel to the axis A and perpendicular to the direction of rotation R. FIG. 8 shows, in a section, the cover plate 2 with front side 2*h*, rear side 2*i* and central opening 2*g*. The apertures 2*a* are arranged in the partial surface 2*k* which extends in frustoconical or substantially frustoconical form, wherein the apertures 2*a* are always arranged spaced apart from the central opening 2*g*. The apertures 2*a* could also, as illustrated in FIG. 3, extend perpendicular or substantially perpendicular with respect to the partial surface 2*k*, or transversely with respect to the partial surface 2*k* as illustrated in FIG. 4.

Depending on the respectively used screw-type centrifugal wheel 20, a partial surface 2*k* of different sizes is covered by the rear side 25*a* of the screw-type centrifugal wheel 20. Using the screw-type centrifugal wheel 20 illustrated in FIGS. 1*a* and 1*b*, it would for example be possible for that partial surface of the front side 2*h* which is denoted in FIG. 6 by 2*k* to be covered in the manner described with regard to FIGS. 1*a* and 1*b*. Using the screw-type centrifugal wheel 20 illustrated in FIGS. 12 and 13, it would for example be possible for that partial surface of the front side 2*h* which is denoted in FIG. 6 by 2*k*2 to be covered permanently.

In a further advantageous embodiment, the cover plate 2 has, as illustrated in FIGS. 6 to 8, a depression which extends in a circumferential direction, in particular a spirally extending depression 2*d* which, beginning in the region of the central opening 2*g*, advantageously runs along the partial surface 2*h* toward the outside. It is advantageous for the depression 2*d* to extend spirally, as illustrated in FIG. 6, from the inside to the outside in the direction of rotation R. Said embodiment has the advantage that contaminants which are conveyed by means of the partial flow F1 via the central opening 2*g* or the gap 2*b* to the front side 2*h* of the cover plate 2 are conveyed along the spirally extending depression 2*d* to the periphery of the partial surface 2*k*. The hub 21 which rotates over the partial surface 2*k* in the direction of rotation R, or the screw-type centrifugal wheel 20 which rotates in the direction of rotation R, further assists in moving the contaminants situated in the depression 2*d* or on the partial surface 2*k* in the direction of rotation R and conveying said contaminants toward the outside in relation to the partial surface 2*k* until the contaminants pass to the main flow F and are entrained and conveyed onward by the latter. Particularly advantageous, therefore, is an arrangement of the aperture 2*a* as illustrated in FIGS. 6 to 8. It can be seen in particular from FIG. 6 that the contaminants are moved substantially in the direction of rotation R, wherein the aperture 2*a* is arranged in a depression 2*c* and the inlet face 2*m* is oriented so as to face oppositely to the direction of rotation R, such that contaminants, even if they flow over the depression 2*c*, scarcely flow or do not at all flow through the aperture 2*a* but are rather conveyed to the main flow F owing to the flow conditions and to the movement direction of the contaminants.

The cover plate 2 may also, as illustrated in FIGS. 7 and 8, have a depression 2*f* which extends along the edge region and which is provided in particular for receiving an O-ring and thus for sealing.

FIG. 9 shows, in a section, a further exemplary embodiment of a cover plate 2 which, by contrast to the section illustrated in FIG. 8, however, has a partial surface 2*k* or 2*k*2 which extends in a flat form. The cover plate 2 is otherwise embodied similar to the embodiment illustrated in FIG. 8, in that the cover plate 2 according to FIG. 9 also has a depression 2*c* which issues into an opening 2*a*. If one imagines the spirally extending depression 2*d* to be omitted, FIG. 6 shows a plan view of the cover plate 2 illustrated in FIG. 9. The cover plate 2 illustrated in FIG. 9 could, however, also have a spirally extending depression 2*d*, such that a plan view of said embodiment would have an appearance as illustrated in FIG. 6. The cover plate 2 illustrated in FIG. 9 furthermore has a central opening 2*g* and a front side 2*h* and a rear side 2*i*. The front side 2*h* or the partial surface 2*k* may extend in a variety of forms, for example in curved form, as illustrated schematically in a section in FIG. 10, or in polyhedral form, as illustrated schematically in a section in FIG. 11. In the most preferred embodiment, the partial surface extends in frustoconical form as illustrated in FIG. 8.

In an advantageous embodiment, the cover plate 2 is embodied as a casting, wherein the depression 2*c* and advantageously also the aperture 2*a* or the inlet opening 21 have already formed part of the unprocessed casting. To complete the cover plate 2, it is then substantially necessary for the front side 2*h* to be subjected to processing, in particular by means of chip-removing processing. A cover plate 2 produced from a casting of such form has the advantage that no additional costs or only very low additional costs are incurred during production because the chip-removing processing of the cover plate 2 is required in any case. The cover plate 2 illustrated in FIGS. 6 to 8, comprising two depressions 2*c* with apertures 2*a*, can therefore be produced with negligibly small additional costs in comparison with cover plates 2 without apertures 2*a*. The casting may have a thickness of between 2 and 10 mm. The cover plate 2 could, however, also be produced from a metal sheet.

The method according to the invention permits self-cleaning of a screw-type centrifugal wheel pump 1. Herein, the screw-type centrifugal wheel pump 1 has a rotatably mounted screw-type centrifugal wheel 20 and a cover plate 2 which is arranged directly adjacent to or behind the screw-type centrifugal wheel 20 and which has a central opening 2*g*, wherein a hub 21 of the screw-type centrifugal wheel 20 or an axle 33 supporting the screw-type centrifugal wheel 15 extends through the central opening 2*g*, such that a fluid-conducting gap 2*b* is formed between the central opening 2*g* and the hub 21 or the axle 33. When the screw-type centrifugal wheel 20 is rotated in the direction of rotation R and thus a fluid is conveyed along a main flow F, a partial flow F1 of the fluid will flow to the rear side 2*i* of the cover plate 2 via an aperture 2*a* spaced apart from the central opening 2*g*, and said partial flow F1 will subsequently flow to the main flow F via the gap 2*b* owing to the pressure difference prevailing between the aperture 2*a* and the gap 2*b*. Said partial flow F1 conveys any contaminants situated in the space behind the cover plate 2 back to the main flow F. The cover plate 2 advantageously has, on its front side 2*h* and on its partial surface 2*k*, a spirally extending depression 2*d*, wherein the spirally extending depression 2*d* runs from the inside to the outside in the direction of rotation R, such that the partial flow F1 emerging from the gap 2*b* and the contaminants possibly situated therein are conveyed to the main flow F via the spirally extending depression 2*d*.

In the exemplary embodiments shown, the cover plate 2 and the housing rear wall 23 are always represented as separate parts. The cover plate 2 and the housing rear wall 23 could also be formed in one piece, for example by virtue of being manufactured from a single part, for example a casting. Such a single casting comprising both the cover plate 2 and also the housing rear wall 23 has the advantage that it can be produced at low cost, and that a seal is no longer required between the cover plate 2 and housing rear wall 23. This allows for a particularly low-maintenance embodiment.

Figure 14:
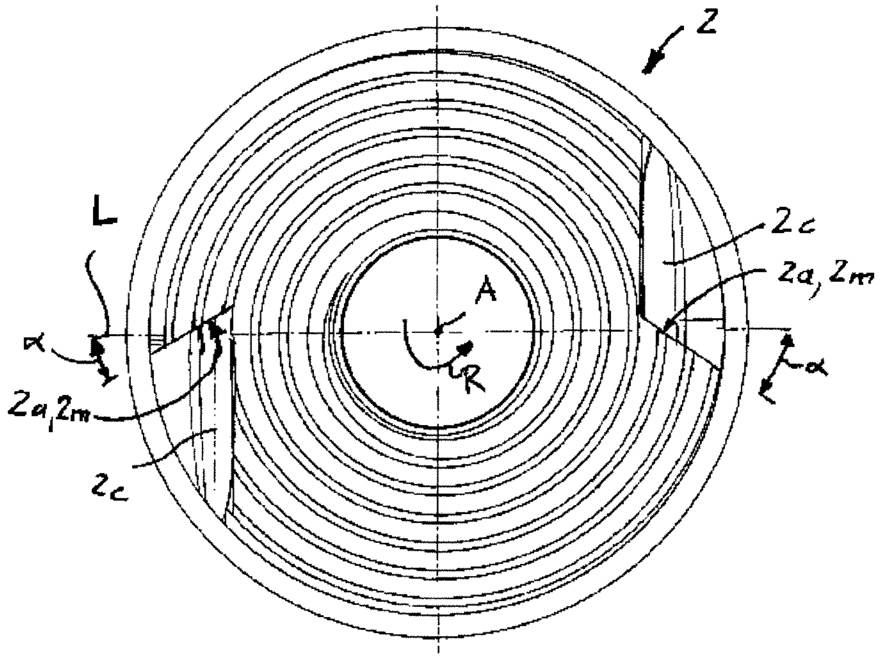
FIG. 14 shows a plan view of a further exemplary embodiment of a cover plate.

FIG. 14 shows, in a plan view, a further exemplary embodiment of the cover plate 2 already illustrated in FIG. 6. As for the opening 2*a* or the inlet face 2*m*, this extends parallel to the axis A, wherein, by contrast to FIG. 6, the opening 2*a* or the inlet face 2*m* extends at an inclination, by an angle $\alpha$ with respect to a straight line L that extends radially through the axis A, wherein the angle $\alpha$ preferably has a value in the range of +/−60 degrees.

The invention claimed is:

1. A screw-type centrifugal wheel pump (1) comprising a pump housing (3) with a pump inflow opening (3*a*) and with a housing rear wall (23) arranged opposite the pump inflow opening (3*a*), comprising a screw-type centrifugal wheel (20) which is rotatably arranged within the pump housing (3) and which has a hub (21) and an impeller (25), and comprising a rotatable drive shaft (33) which is connected to the screw-type centrifugal wheel (20) and which is rotatable about an axis of rotation (A), and comprising a cover plate (2) which is arranged between the screw-type centrifugal wheel (20) and the housing rear wall (23), wherein the cover plate (2) has a central opening (2*g*) through which the hub (21) or the drive shaft (33) extends, and wherein an interior space (37) is formed between the cover plate (2) and the housing rear wall (23), wherein the cover plate (2) has a front side (2*h*) oriented toward the pump inflow opening (3*a*), and wherein the front side (2*h*) comprises a partial surface (2*k*) the form of which is implemented adapted to a rear side (25*a*) of the screw-type centrifugal wheel (20) in such a way that a first gap (24) of maximally 3 mm is formed between the front side (2*h*) of the cover plate (2) and the rear side (25*a*) of the screw-type centrifugal wheel (20), wherein between the central opening (2*g*) of the cover plate (2) and the hub (21) or the drive shaft (33) there is formed a second gap (2*b*), which is connected in fluid-conducting fashion to the interior space (37) and to the first gap (24), wherein the cover plate (2) has at least one aperture (2*a*) which is arranged and spaced apart from the central opening (2*g*), wherein the screw-type centrifugal wheel (20) and the arrangement of the aperture (2*a*) are embodied and adapted to one another such that the rear side (25*a*) of the screw-type centrifugal wheel (20) does not cover the aperture (2*a*) or covers the aperture (2*a*) only over a partial angle in a rotation of the screw-type centrifugal wheel (20) through 360°, and wherein the aperture (2*a*) forms a fluid-conducting connection between the front side (2*h*) and the interior space (37) in order to generate a fluid flow (F1), which flows into the interior space (37) via the aperture (2*a*) and then flows out of the interior space (37) via the second gap (2*b*), wherein the hub (21) has a protrusion which covers the partial surface (2*k*) partially with the result that the first gap (24) is formed between the hub (21) and the partial surface (2*k*) and wherein the first gap (24) runs transversely with regard to the axis of rotation (A).

2. The screw-type centrifugal wheel pump as claimed in claim characterized in that the first gap (24) has a width in the range from 0.5 mm to 2 mm.

3. The screw-type centrifugal wheel pump as claimed in claim 1, characterized in that the partial surface (2*k*) extends in substantially frustoconical form.

4. The screw-type centrifugal wheel pump as claimed in claim 1, characterized in that the cover plate (2) has at least two apertures (2*a*), wherein the at least two apertures (2*a*) are arranged in particular symmetrically with respect to the axis of rotation (A).

5. The screw-type centrifugal wheel pump as claimed in claim 1, characterized in that the aperture (2*a*) has an inlet opening (21) in the direction of the front side (2*h*), in that the front side (2*h*) has a depression (2*c*), and in that the inlet opening (3*a*) is arranged in said depression (2*c*).

6. The screw-type centrifugal wheel pump as claimed in claim 5, characterized in that the inlet opening (21) forms an inlet face (2*m*) which extends substantially parallel to the axis of rotation (A).

7. The screw-type centrifugal wheel pump as claimed in claim 6, characterized in that the depression (2*c*) is formed at least partially by a bore extending substantially perpendicular to the axis of rotation (A).

8. The screw-type centrifugal wheel pump as claimed in claim 6, characterized in that the screw-type centrifugal wheel (20) has a direction of rotation (R), and in that the inlet face (2*m*) formed by the inlet opening (3*a*) of the aperture (2*a*) extends substantially parallel to the axis of rotation (A) and so as to face oppositely to the direction of rotation (R).

9. The screw-type centrifugal wheel pump as claimed in claim 5, characterized in that the cover plate (2) consists of a casting, and in that the depression (2*c*) and advantageously also the inlet opening (21) have already formed part of an unprocessed casting.

10. The screw-type centrifugal wheel pump as claimed in claim 1, characterized in that the aperture (2*a*) extends perpendicular or substantially perpendicular to the partial surface (2*k*).

11. The screw-type centrifugal wheel pump as claimed in claim 1, characterized in that the aperture (2*a*) extends transversely with respect to the partial surface (2*h*).

12. The screw-type centrifugal wheel pump as claimed in claim 1, characterized in that the cover plate (2) consists of a metal sheet.

13. The screw-type centrifugal wheel pump (1) as claimed in claim 12, characterized in that the screw-type centrifugal wheel (20) has a direction of rotation (R), and in that the inlet face (2*m*) formed by the inlet opening (21) of the aperture (2*a*) extends substantially parallel to the axis of rotation (A) and so as to face oppositely to the direction of rotation (R).

14. The screw-type centrifugal wheel pump as claimed in claim 1, characterized in that the aperture (2*a*) extends oppositely to the direction of rotation (R) of the screw-type centrifugal wheel (20).

15. The screw-type centrifugal wheel pump as claimed in claim 1, characterized in that the hub (21) of the screw-type centrifugal wheel (20) comprises a circular base part (30), in that the impeller (25) is arranged on the circular base part (30), and in that the circular base part (30) is arranged concentrically with respect to the axis of rotation (A) and has a maximum radius (R1), wherein the maximum radius (R1) is adapted to the aperture (2*a*) such that the rear side (25*a*) of the screw-type centrifugal wheel (20) does not cover the aperture (2*a*).

16. The screw-type centrifugal wheel pump as claimed in claim 1, characterized in that the hub (21) of the screw-type centrifugal wheel (20) comprises a sickle-shaped base part (30) in that the vane (25) is arranged on the sickle-shaped base part (30), and in that the sickle-shaped base part (30) has a maximum radius (R1) and a minimum radius (R2) in relation to the axis of rotation (A), wherein the sickle-shaped base part (30) is embodied so as to extend relative to the aperture (2*a*) such that the rear side (25*a*) of the screw-type centrifugal wheel (20) does not cover the aperture (2*a*) at the minimum radius (R2) and such that the rear side (25*a*) of the screw-type centrifugal wheel (20) covers the aperture (2*a*) over a partial angle (A) in a rotation of the screw-type centrifugal wheel (20) through 360°.

17. The screw-type centrifugal wheel pump as claimed in claim 1, characterized in that the partial surface (2*k*) has a spirally extending depression (2*d*) which, beginning substantially in the region of the central opening (2*g*), runs along the partial surface (2*k*) toward the outside.

18. The screw-type centrifugal wheel pump (1) as claimed in claim 1, characterized in that the partial surface (2*k*) is oriented towards the pump inflow opening (3*a*).

19. The screw-type centrifugal wheel pump (1) as claimed in claim 1, characterized in that at least one surface oriented toward the gap (24) is embodied in a structured or rough fashion or provided with protruding teeth.

20. A method for the self-cleaning of a screw-type centrifugal wheel pump (1) having a rotatably supported screw-type centrifugal wheel (20) which is rotatably arranged within a pump housing (3) and which has a hub (21) and an impeller (25), and comprising a rotatable drive shaft (33) which is connected to the screw-type centrifugal wheel (20) and which is rotatable about an axis of rotation (A), and having a cover plate (2) which has a central opening (2*g*) and is arranged on a rear side (25*a*) of the screw-type centrifugal wheel (20), wherein the cover plate (2) has a front side (2*h*) oriented toward a pump inflow opening (3*a*), and wherein the front side (2*h*) comprises a partial surface (2*k*) the form of which is implemented adapted to the rear side (25*a*) of the screw-type centrifugal wheel (20) so as to form a first gap (24), wherein the cover plate (2) has an aperture (2*a*) which is spaced apart from the central opening (2*g*), wherein the hub (21) or the drive shaft (33) of the screw-type centrifugal wheel (20) extends through the central opening (2*g*) such that a fluid-conducting second gap (2*b*) is formed between the central opening (2*g*) and the hub (21) or the drive shaft (33), wherein the screw-type centrifugal wheel (20) and the arrangement of the aperture (2*a*) are implemented and adapted to one another such that, in the rotation of the screw-type centrifugal wheel (20), the rear side (25*a*) of the screw-type centrifugal wheel (20) does not cover the aperture (2*a*) or cover the aperture (2*a*) only over a partial angle, wherein the screw-type centrifugal wheel (20) is rotated in a direction of rotation (R) and thereby conveys a fluid along a main flow (F), wherein a partial flow (F1) of the fluid flows via the aperture (2*a*) to the rear side (2*i*) of the cover plate (2), and wherein said partial flow (F1) subsequently flows the main flow (F) via the first and second gaps (24, 2*b*), owing to the pressure difference prevailing between the aperture (2*a*) and the second gap (2*b*), wherein the hub (21) has a protrusion which covers the partial surface (2*k*) partially with the result that the first gap (24) is formed between the hub (21) and the partial surface (2*k*), and wherein the first gap (24) runs transversely with regard to the axis of rotation (A).

21. The method as claimed in claim 20, wherein the cover plate (2) has, on its front side (2*h*) a spirally extending depression (2*d*), wherein the spirally extending depression (2*d*) runs from the inside to the outside in the direction of rotation (R), such that the partial flow (F1) emerging from the second gap (2*b*) is fed to the main flow (F) via the spirally extending depression (2*d*).

22. The method as claimed in claim 20, characterized in that the partial flow (F1) is diverted, in order to thereby separate solid matter from the partial flow (F1), as it flows into the aperture (2*a*).

23. A cover plate (2) for a screw-type centrifugal wheel pump having a rotatably supported screw-type centrifugal wheel (20) which is rotatably arranged within a pump housing (3) and which has a hub (21) and an impeller (25), and comprising a rotatable drive shaft (33) which is connected to the screw-type centrifugal wheel (20) and which is rotatable about an axis of rotation (A), wherein the cover plate (2) has a front side (2*h*) and a rear side (2*i*), and wherein the front side (2*h*) comprises a partial surface (2*k*) the form of which is implemented adapted to a rear side (25*a*) of the screw-type centrifugal wheel (20), and wherein the cover plate (2) has a central opening (2*g*) in its center, wherein the central opening (2*g*) is embodied and adapted for the passage of the axis of rotation (A) of the screw-type centrifugal wheel (20) and extends in the direction of the axis of rotation (A), and wherein the cover plate (2) has at least one aperture (2*a*) which is arranged and spaced apart from the central opening (2*g*), and wherein the aperture (2*a*) forms a fluid-conducting connection between the front side (2*h*) and the rear side (2*i*) of the cover plate (2), and wherein the aperture (2*a*) has an inlet opening (21) in the direction of the front side (2*h*), and wherein the front side (2*h*) has a depression (2*c*), wherein the inlet opening (21) is arranged in said depression (2*c*), wherein the inlet opening (21) forms an inlet face (2*m*) which extends substantially parallel to the axis of rotation (A), and wherein the hub (21) has a protrusion which covers the partial surface (2*k*) partially with the result that a first gap (24) is formed between the hub (21) and the partial surface (2*k*), and wherein the first gap (24) runs transversely with regard to the axis of rotation (A).

24. The cover plate (2) as claimed in claim 23, characterized in that the cover plate (2) has at least two apertures (2*a*), wherein the at least two apertures (2*a*) are in particular arranged symmetrically with respect to the axis of rotation (A).

25. The cover plate (2) as claimed in any one of claim 23, characterized in that the depression (2*c*) is formed at least partially by a bore extending substantially perpendicular to the axis of rotation (A).

26. The cover plate (2) as claimed in claim 23, characterized in that the aperture (2*a*) extends perpendicular or substantially perpendicular to the front side (2*h*).

27. The cover plate (2) as claimed in claim 23, characterized in the the aperture (2*a*) extends transversely with respect to the front side (2*h*).

28. The cover plate (2) as claimed in claim 23, characterized in that the partial surface (2*k*) has a spirally extending depression (2*d*) which, beginning substantially in the region of the central opening (2*g*), runs along the partial surface (2*k*) toward an outside.

29. The cover plate (2) as claimed in claim 23, characterized in that the partial surface (2*k*) is oriented towards the rear side (25*a*) of the screw-type centrifugal wheel (20).

* * * * *